C. PEPPER.
Cook Stove.
No. 26,521.
2 Sheets—Sheet 1.
Patented Dec. 20, 1859.
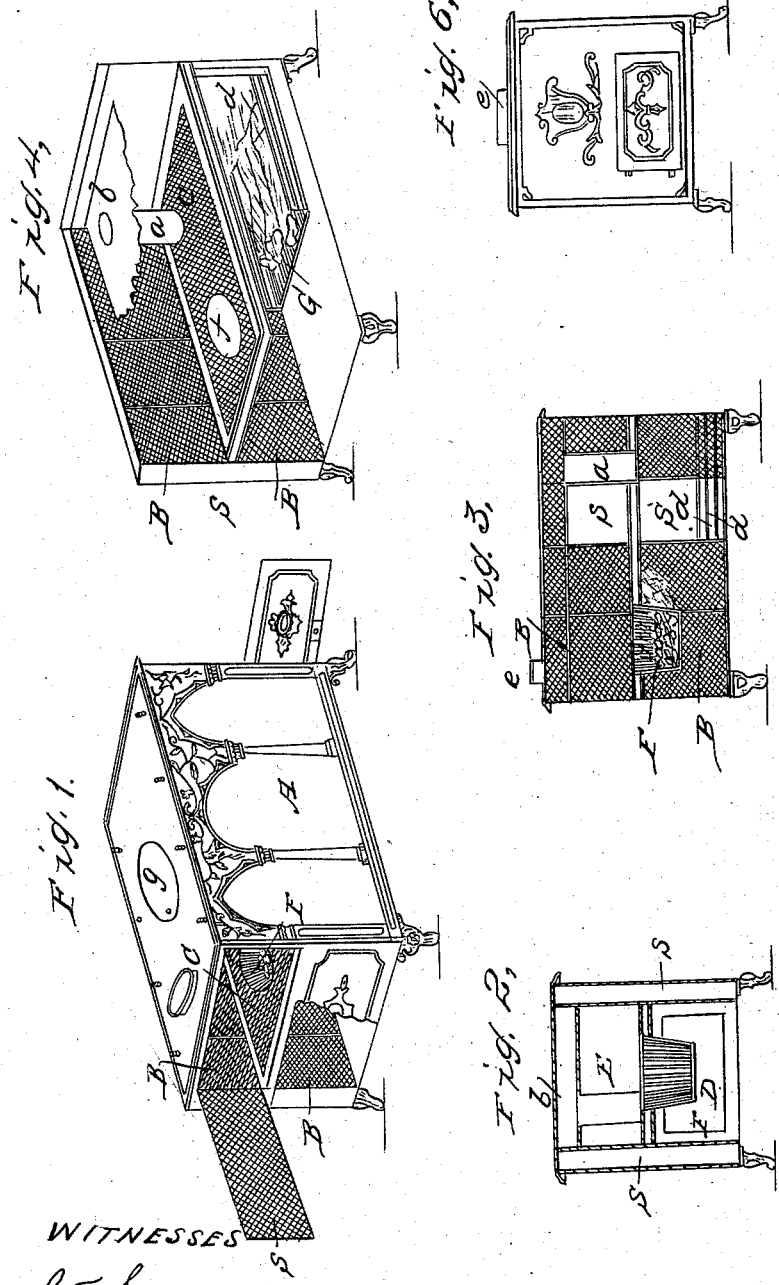
WITNESSES
INVENTOR.

2 Sheets—Sheet 2.
C. PEPPER.
Cook Stove.
No. 26,521. Patented Dec. 20, 1859.
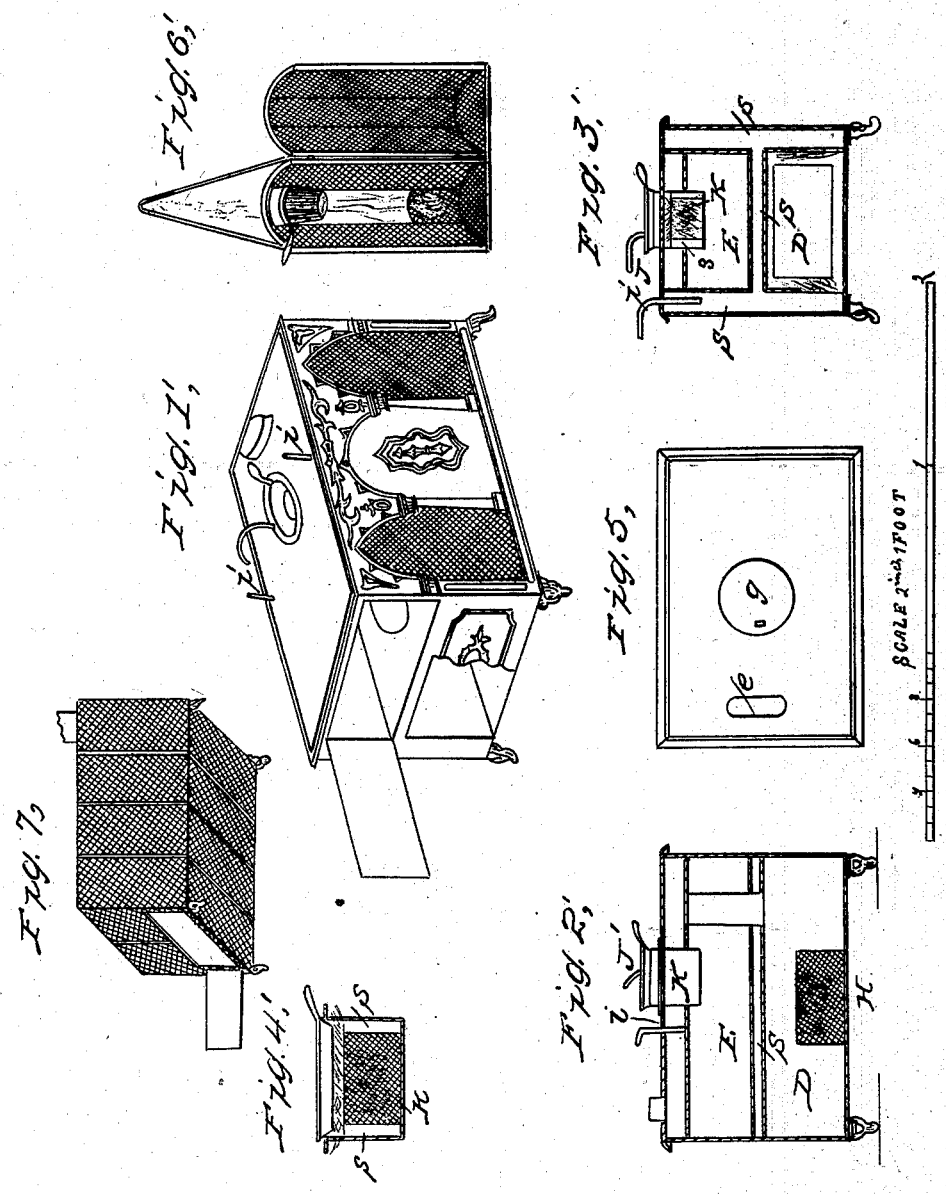
WITNESSES: INVENTOR:

UNITED STATES PATENT OFFICE.

CALVIN PEPPER, OF ALBANY, NEW YORK.

HEATING APPARATUS.

Specification of Letters Patent No. 26,521, dated December 20, 1859.

*To all whom it may concern:*

Be it known that I, CALVIN PEPPER, of the city of Albany and State of New York, have invented, made, and applied to use certain new and useful Improvements in Heating or Calorimetry; and I hereby declare that the following is a full and exact description of the construction, combination, and operation of the same, reference being had to the several drawings accompanying and making part of this application.

The nature of my invention consists of such use of fine silicious sand, as to make available its superior radiating properties for heating purposes so as to heat principally by radiation from the surface of the sand, and for this purpose I use fine wire gauze screen to retain the sand. Sand requires less heat to raise it to a given temperature so as to make it available for heating purposes than other heating mediums in use, according to that law, of the difference of specific caloric or capacity of caloric or susceptibility of bodies to caloric as variously termed by chemistry, by which different bodies require unequal quantities of heat, to heat them equally.

I find from actual experiment, that I can raise a given weight of sand to a given temperature with five times less application of heat, than I can raise the same weight of iron to the same temperature. The sand is also a much better absorbent of heat than metal, and as radiation and absorption, are in direct proportion, we hence get greater radiation from the sand, weight by weight than from metal. I have demonstrated by actual experiment, that the sand will radiate with five times more power, from equal areas of surface, than the iron, though the iron be black and rough. Sand too, as between its own particles, conducts heat much less than iron, according to the fact well known to chemists, that as between the earths and the metals, the metals are by far the best conductors, and the feeblest radiators. It is owing to this feeble conducting power of sand, that it retains its heat longer than iron, notwithstanding its superior radiation for the sand as before stated requires less application of caloric to give it its radiating temperature, what the radiation looses from feeble conduction, being more than compensated, by the difference of specific caloric. I have demonstrated by experiment, that if we take equal weights of sand and iron, make them of the same superficial extent, and heat them to the same temperature, that the sand will maintain a sensible temperature within a given range for heating purposes, equivalent to three times the length of time, the iron will maintain it. The superior radiation of the sand is a positive gain for heating purposes, as compared with other heating mediums, the sand still maintaining its superiority in every other respect and the value of my invention, consists in making sand the principal, and as far as possible, the exclusive radiating surface for heating purposes, and for the purpose of showing my new and novel method, of such application and use of sand, and to enable those skilled in such business to construct the same or other similar heating apparatus, I give the following description.

Figure 1 of the drawing represents a profile view of a kitchen sand cook stove, for the use of wood or coal. The outer sides of the stove are composed of cast or sheet iron plates. The inner sides of the stove as at B Figs. 1, 3 and 4, consist principally of fine wire gauze screen, as made of iron, copper, brass, &c., and are parallel to the outside plate one inch apart, the space between the plates being filled in with fine silicious sand, the sand being used as the heating medium, and for radiation through the meshes of the screen into the interior of the stove or oven. The sand I prefer is such as used by stone polishers in polishing stones, and to be found upon every sea shore. The screen is used merely to retain the sand in its place, without much interception of the radiating rays, and is in common use for several purposes. The openings of the screen are so minute, as not to allow the sand to pass through, and so numerous to the square inch, as to expose most all the surface of the sand for radiating purposes. The wires being of such extreme tenuity of filament form, that there is but little metallic matter in proportion to the screen surface. Practically, there is no escape of sand through the meshes of the screen, and the screen itself makes but little difference in the sand radiation. Metal plates minutely and numerously perforated may be used, and have been used by me, instead of the screen. The sand is not only in itself infusible, and indestructible by the intensest heat unless some foreign substance be present that may act as a flux, but such are its absorbing powers, that it is a perfect protection of the metal and screen in close contact with it, and as long as the contact is complete the screen cannot burn out. The screen and perforated metal are not my invention, but I was the first to use it for retaining sand, and at the same time preserving the sand radiation, and such use of screen, is an important part of my invention. The thickness of the sand will vary according to the size of the stove and frequency and duration of the fire or heating process required, one inch in thickness being sufficient for all ordinary purposes and being more than equivalent for all heating purposes to solid metal of the same thickness. The drawings represent vertical partitions, separating the sand into columns, and each space is filled with sand through an opening or small tube at the top. It may be found sometimes practically convenient, to have horizontal as well as vertical partitions, to distribute the weight or pressure. The middle horizontal double plate C Fig. 4, dividing the stove into the fire chamber D and upper oven E Fig. 2, has its upper side mostly of screen as seen at (c) Fig. 4, and the inch space between the two plates, is also filled with sand as seen at (s) Fig. 3, (s) representing sand in all the drawings. The double bottom of the stove also contains sand with screen upon the upper side. The doors of the stove are also lined with sand and screen. Thus almost the whole interior of the stove is lined with sand, kept in its place by gauze wire screen, the sand retaining the heat from escaping upward, and at the same time radiating its heat into the stove. The other parts of the stove have no peculiarities of construction, as parts of the invention and may be very briefly described. A fire is seen burning upon the wood fire grate G Fig. 4, the grate composed of horizontal bars (d, d) and coal when used for fuel, is seen burning in the open coal grate fire pot F Fig. 2, extending from the oven E into the fire chamber D. The products of combustion enter the pipe (a) Fig. 4 or a flue in the rear of the fire chamber, and pass through the smoke or hot air passage (b) (b) between the double plate at the top of the stove, and escape through the chimney pipe (e) Fig. 1.

Fig. 2 is a vertical section of the stove giving an end view looking into the stove, the sand filling the sides being seen at (s).

Fig. 3 is a vertical section giving an interior side view, the screen being removed from one of the columns of sand, to show the sand at (s).

Fig. 4 is a representation of the stove, with the top front and one of the sides removed.

Fig. 5 is the top plate of the stove and Fig. 6 the rear end.

It is evident that this kitchen sand cook stove may be converted into a parlor cook stove, for wood or coal, by having the screen or sand surface outside instead of inside so that the radiation from the sand, will be into the room, instead of into the interior of the stove.

The stove as above described may also be used with gas as fuel, in the manner of using gas and sand in combination for heating and illuminating purposes, as described in the patent to Calvin Pepper, dated December 14th 1858, but the same having been already secured to me by patent, I make no claim therefor in this application.

Fig. 1' Plate 2, is a profile view of a combination sand parlor cook stove for the use of wood coal or gas. It is used with wood or coal as before described. The sand radiating surface is mostly into the room as shown in the drawing. The middle column of sand on each side of the stove, is covered with screen at the inside bottom part of that column only, as so much gas fire surface within the stove, and represented at H' Fig. 2.

Fig. 2 is a vertical section showing the interior of a longitudinal half of the stove. The sand is not full to the top of the middle column on the sides of the stove, a space being allowed between the top of that column of sand and its upper covering into which the gas enters from the gas pipe (i) in Fig. 2', the pipe just entering this gas diffusing chamber and opening into it. The pressure of gas from the gasometer, forces the gas down through its column of sand, and the gas having no other escape than through the screen at H', at the lower bottom side of the stove is ignited upon the external surface of the sand within the stove through the screen. On the top of the stove entering downward into the upper oven E' is placed a small cylinder gas and sand heater K Fig. 2', for boiling water, frying meat and heating the upper oven E sufficient to bake biscuit without heating the stove at large, by a fire in the lower oven or fire chamber. Within the outer periphery of sheet metal, is another inside sheet lining parallel with the outside metal the two being one inch apart the concentric space between being filled with sand as at (s) Fig. 4. Within one quarter of an inch of the top, this remaining vacant space from the top of the sand being left as a receptacle for the gas, as it enters from the gas pipe (j). The lower part of the inner surface is of screen, against which the sand rests, and through which the gas burns upon the screen surface. The air is supplied to the fire within the cylinder from an opening with a slide in the bottom, and passes off with the products of combustion through lateral openings near the top of the cylinder into the oven E which it helps to heat, and hence through a flue in the top of the stove into the chimney pipe.

Fig. 3' is a vertical section of the stove showing the heater with the gas fire burning within.

Fig. 4' is a vertical section of the gas heater with a vessel for cooking on top of it.

Fig. 6', is a simple form of a cylinder heater with a funnel or cone top, gas burning within it at the concave bottom part of the inner periphery and coal burning within an open grate suspended within the stove, either fire heating the sand within the screen and with the door open, giving extensive radiating surface into the room as from an open fire place. It is obvious that many other forms of construction to the stove may be adopted. A simple cylinder or a rectangular stove for the use of sand and screen and the radiation as described to be used with any kind of fuel would be of itself a full application, of the entire principles of my invention. Such a rectangular stove for the use of wood is represented in the drawing Fig. 7', the stove being surrounded externally with screen surface, through which the sand radiates into the room, the inner plates being solid. The sand and screen may be placed around hot water and steam tubes, the sand being made the radiating surface instead of the surface of the tubes, and I allege that such sand surface does not burn or desiccate the air coming in contact with it, to the same extent as hot air in contact with hot metal, and that it renders the temperature more equitable and uniform, and the air better adapted to the purposes of respiration. The sand from its absorbing powers, readily takes up the heat by contact with the metal, from such currents of steam, passing through the tubes, or from the hot water in the tubes, and radiates much better from its sand surface through the screen, than the tubes or conductors would radiate if exposed. Care must be taken that the quantity of sand, should be in proportion to the caloric to be applied, and the heat required, and in general one half inch in thickness, should be the maximum to be placed around steam and hot water tubes. I allege that I have applied the principles of my invention, to generating steam in steam boilers, but as some peculiarities of construction are required, make no claim therefor in this application.

It will thus be seen, that my invention consists substantially in the use of a plate of metal with a parallel sheet of wire gauze screen, the space between being filled with silicious sand. In ovens the screen is the interior surface. In stoves for heating the screen is the exterior surface, and as used with tubes of hot water or steam, the tube constitutes the plate of metal, and the screen of wire is the external surface.

As the principle of my invention is exposed sand surface I make no claim in this application for the use of sand when inclosed in metal or other solid casing, and as described in the application of J. Miller, for patent rejected December 3rd 1847, and as described in the Patent of Samuel Whitmarsh No. 9206—issued August 17th 1852 and as described in the patent of James Easterly dated April 13th 1858, but I allege and reserve my rights therefor for separate application, that I was the first to use sand entirely inclosed in metal for heating apartments, and as distinguished from merely retaining the heat. As extent of radiating surface and quantity or radiation, are conditions of my invention, I make no claim for the use of sand, when used principally for heating or keeping hot or warm, bodies and substances immersed in it, as in sand baths, and used by chemists in their laboratories or when heated for the warmth of the soil, or the warmth or growth of vegetation, or when used principally to heat by actual contact or close proximity, as in sand bags and portable foot stoves or stools.

As the utility of my invention depends upon the properties of silicious sand the purity and percentage of the silica, and its granulated or comminuted state, I do not claim the use of sand when its grains or particles are in a state of aggregation as in sand stone, soap stone, pumice stone, quartz rock, flint, pebble stones, or other solid massive or fragmentary state; nor do I claim the use of argilacious or calcareous earth, of clay lime gypsum plaster of paris, charcoal dust, or other earthy or comminuted substance, other than silicious sand, though used not only for their nonconducting properties, but also for radiation of heat.

I allege that the use of sand as herein described as my invention, simplifies facilitates and cheapens the production and use of heat for the purposes stated; produces new and valuable heating effects over any stove without the use of sand, or with sand as used and applied by other persons for heating purposes; and that the utility and mercantile value of heating apparatus are thereby increased.

What I claim as my invention, and desire to secure by Letters Patent, is—

The use of fine silicious sand for radiating heat according to the application thereof substantially as described, the radiation being principally from the sand, and the radiation from the sand coming from between the meshes of the fine wire gauze screen, or the openings of minutely perforated metal, or other solid substance, the metallic gauze or perforated metal being used for the purpose of retaining the sand while admitting radiation through its meshes, and the sand being heated by fuel or wood, coal, gas, burning fluid or other fuel, or from hot metal, hot air, hot water or steam, in stoves, tubes, conductors or other heating apparatus substantially as described and subject to the disclaimers and exceptions as before stated.

CALVIN PEPPER.

Witnesses:
S. T. SAVAGE,
SAMUEL G. CONE.